US012249786B2

(12) United States Patent
Hirota

(10) Patent No.: US 12,249,786 B2
(45) Date of Patent: Mar. 11, 2025

(54) CONNECTOR MOUNTING MEMBER

(71) Applicant: DAIWA KASEI INDUSTRY CO., LTD., Okazaki (JP)

(72) Inventor: Kazuhisa Hirota, Okazaki (JP)

(73) Assignee: DAIWA KASEI INDUSTRY CO., LTD., Okazaki (JP)

( * ) Notice: Subject to any disclaimer, the term of this patent is extended or adjusted under 35 U.S.C. 154(b) by 369 days.

(21) Appl. No.: 18/054,263

(22) Filed: Nov. 10, 2022

(65) Prior Publication Data

US 2023/0208069 A1 Jun. 29, 2023

(30) Foreign Application Priority Data

Dec. 28, 2021 (JP) ................................ 2021-214845

(51) Int. Cl.
*H01R 13/506* (2006.01)
*H01R 13/516* (2006.01)
*H01R 13/74* (2006.01)

(52) U.S. Cl.
CPC ......... *H01R 13/506* (2013.01); *H01R 13/516* (2013.01); *H01R 13/745* (2013.01); *H01R 2201/26* (2013.01)

(58) Field of Classification Search
CPC .. H01R 13/506; H01R 13/516; H01R 13/745; H01R 2201/26; H01R 4/4814; H01R 13/639; H01R 13/40; H01R 13/502; H01R 13/629; B60R 16/0215
See application file for complete search history.

(56) References Cited

U.S. PATENT DOCUMENTS

| | | | | |
|---|---|---|---|---|
| 7,887,012 | B2 * | 2/2011 | Desai | F16L 3/1075 248/68.1 |
| 8,020,812 | B2 * | 9/2011 | Matsuno | F16L 3/1075 24/336 |
| 8,733,709 | B2 * | 5/2014 | Meyers | F16L 3/223 248/65 |
| 9,453,593 | B2 * | 9/2016 | Pearson | F16L 3/1075 |
| 10,655,374 | B2 * | 5/2020 | Fukumoto | F16L 3/237 |

FOREIGN PATENT DOCUMENTS

JP 2014-084978 A 5/2014

* cited by examiner

*Primary Examiner* — Briggitte R. Hammond
(74) *Attorney, Agent, or Firm* — McClure, Qualey & Rodack, LLP

(57) ABSTRACT

Provided is a connector mounting member that can be fixed to a vehicle body so as to generate no abnormal sound and that can stably hold various kinds of connectors. The connector mounting member includes a holding portion configured to hold a connector attached to an end of a long wire portion; and a mounting portion configured to mount the connector mounting member to a predetermined counterpart component. The holding portion includes a frame, opposing elastic portions that press-hold the connector therebetween, and opposing positioning portions that press-hold therebetween the wire portion extending from the connector on at least one opening side of the frame and that are less easily deformed than the opposing elastic portions.

3 Claims, 12 Drawing Sheets

CONNECTOR MOUNTING MEMBER

RELATED APPLICATIONS

This application claims the priority of Japanese Patent Application No. 2021-214845 filed on Dec. 28, 2021. The disclosure of the prior application is hereby incorporated herein in the entirety by reference.

BACKGROUND OF THE INVENTION

Field of the Invention

This invention relates to a connector mounting member.

Description of Related Art

There is a case where, in a wire harness routed in a vehicle, a part of wires is branched midway. A connector is connected to the end of the branched wire. In a case where a wire harness including such branched wires is routed in a vehicle, the branched wire portion may not necessarily be used. In this case, the unused branched wires and other wires are collectively bound with a tape member (option tape). In a case where the branched wire is used later, the branched wire can be used by cutting the tape member.

However, in a case where such a wire harness is disposed in a vehicle in a state where the branched wire is not used, if, at the position at which the branched wire is disposed, a space is insufficient or the connector comes into contact with another component to generate an abnormal sound due to vibration during running, the wire harness including the branched wire as described above cannot be used. Therefore, to date, a wire harness including no branched wire has been separately prepared so as to have another component number, and prepared to be used instead of the wire harness including the branched wire. In this case, a problem arises that the number of the component numbers is increased, and labor and cost for managing the wire harnesses are also increased. A method other than a method in which a wire harness is prepared so as to have another component number is, for example, a method in which a dummy holder that simulates a device connectable to a connector disposed at the end of the branched wire is fixed to a vehicle, and the connector is connected to a terminal portion of the dummy holder to prevent generation of an abnormal sound. Also in this case, a problem arises that cost is increased for producing and managing the dummy holders.

Meanwhile, Japanese Laid-Open Patent Publication No. 2014-84978 discloses a clip for attaching a connector in a wire harness to a vehicle body panel. In a case where the clip is utilized, a connector of an unused branched wire is mounted to the clip and can thus be easily fixed to a vehicle body, so that an abnormal sound due to vibration during running may not be generated. However, also in this case, a problem arises that a clip needs to be prepared so as to correspond to each kind/shape of a connector, and labor and cost for managing the clips are increased.

An object of this invention is to provide a connector mounting member that can be fixed to a vehicle body, and can stably hold various kinds of connectors.

SUMMARY OF THE INVENTION

In order to attain the aforementioned object, a connector mounting member of this invention includes:

a holding portion configured to hold a connector to which a long wire portion is attached; and a mounting portion configured to mount the connector mounting member to a predetermined counterpart component, in which the holding portion includes an annular frame, opposing elastic portions formed in the frame so as to oppose each other in an up-down direction, the opposing elastic portions configured to be elastically deformed so as to widen an opposing distance therebetween in the up-down direction and thus press-hold the connector between the opposing elastic portions that oppose each other, and opposing positioning portions formed on at least one opening side of the frame so as to oppose each other, the opposing positioning portions configured to press-hold the wire portion extending from the connector that is press-held between the opposing elastic portions, between the opposing positioning portions that oppose each other, and configured to less easily widen an opposing distance therebetween by elastic deformation than the opposing elastic portions.

The connector mounting member having the above-described configuration can be fixed to a vehicle body. Therefore, generation of an abnormal sound is not caused by contact between the connector and another component due to vibration during running. In this state, since the connector is held between the upper and the lower elastic portions, various kinds of connectors having various shapes can be held. Moreover, since a wire extending from the connector that is press-held between the elastic portions is also press-held, the connector can be stably held. A wire is unlikely to be broken near the connector due to a torsional force. Furthermore, the opposing positioning portions that press-hold a wire therebetween is shaped such that such a gap as to hold a wire having a width less than the connector is formed between the opposing positioning portions that oppose each other, and the gap is not easily widened by elastic deformation. Therefore, if the connector is drawn toward the wire in a state where the connector is held, the opposing positioning portions are positioned so as to be in contact with the connector, and can also function as a portion for preventing disengagement of the connector.

The frame may be formed so as to have a wire side section in which an internal space is spread on an outer circumferential side as compared with a connector holding section in which the opposing elastic portions are formed, in an inner portion on the opposing positioning portion side in a penetration direction of the frame. A connector is typically shaped so as to expand/protrude outward on the rear end side from which the wire extends, in many cases. In the above-described configuration, the expanding/protruding portion can be stored, and the front end side portion in which the expanding/protruding portion is unlikely to be disposed can be stably press-held between the opposing elastic portions. The wire side section can be easily formed in the frame by forming, for example, a section in which the opposing elastic portions are not formed.

The opposing elastic portions and the opposing positioning portions may be formed so as to satisfy a positional relationship in which both the opposing positioning portions seem to pass between the opposing elastic portions that oppose each other without overlapping the opposing elastic portions, as viewed in the penetration direction of the frame. In this configuration, the opposing positioning portions are disposed in a height region between the upper and the lower opposing elastic portions that oppose each other, in the up-down direction. A wire extends rearward from almost the center position of the connector held between the opposing elastic portions, and, therefore, the opposing positioning portions positioned as configured above can hold the wire therebetween without difficulty.

DESCRIPTION OF THE PREFERRED EMBODIMENTS

Embodiments of this invention will be described below with reference to the drawings.

Figure 1:
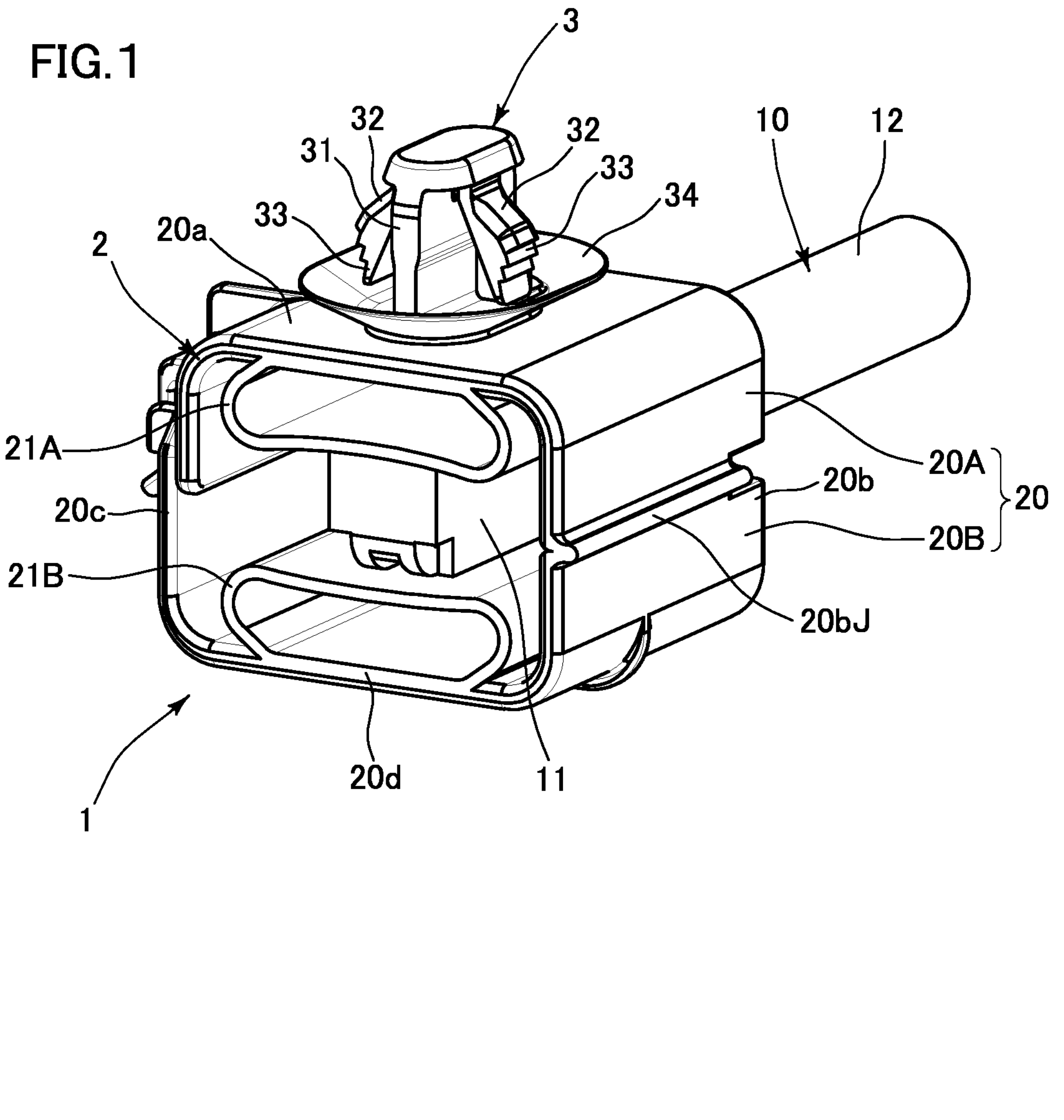
FIG. 1 is a perspective view showing a state where a connector mounting member according to a first embodiment of this invention holds a connector.

A connector mounting member 1 of the present embodiment has a structure in which, as shown in FIG. 1, a holding portion 2 for holding a connector 11 attached to a long wire member 10, and a mounting portion 3 for mounting the connector mounting member 1 to a predetermined counterpart component 210 (see FIG. 3 and FIG. 4) are integrated with each other. In the present embodiment, the entirety of the connector mounting member 1 including the holding portion 2 and the mounting portion 3 is integrally formed by using a single material such as resin or elastomer. However, the connector mounting member 1 may not necessarily be integrally formed by using a single material, and may be integrally formed by using a plurality of materials through, for example, double molding.

Figure 6:
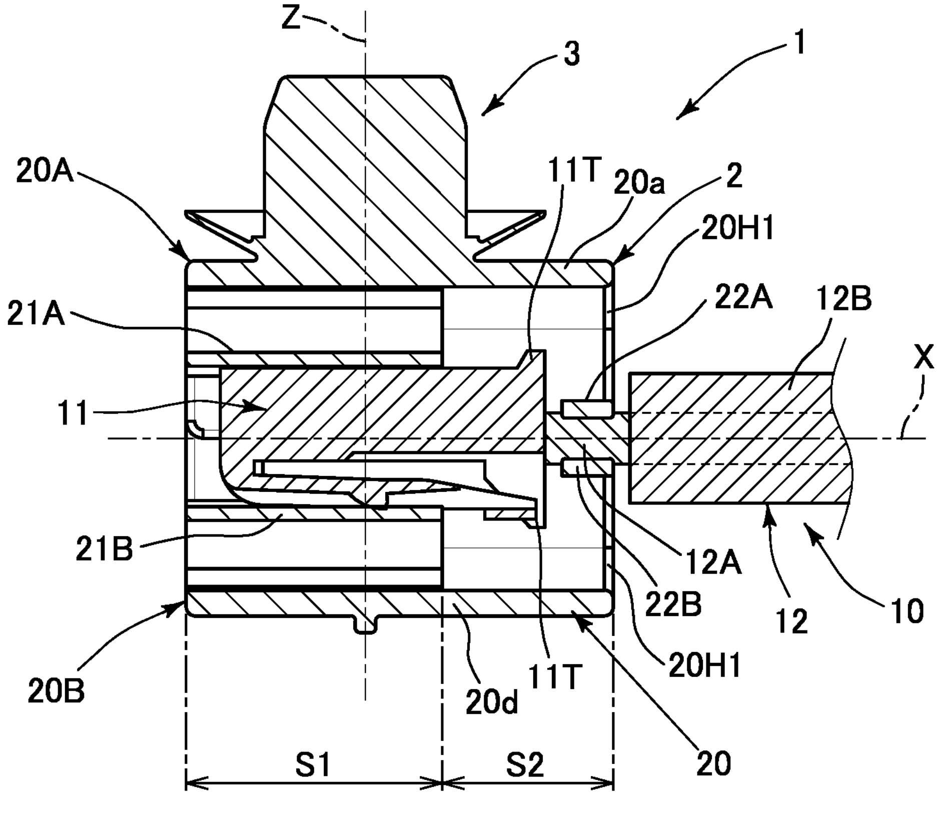
FIG. 6 is a central cross-sectional view of the connector mounting member in FIG. 4.

The wire member 10 has a wire portion 12 in which an outer circumference of a wire 12A in a core portion is covered by a protective member 12B, and the connector 11 attached to an end of the wire portion 12 in the longitudinal direction, as shown in FIG. 6. In the present embodiment, the wire member 10 is a single wire member included in a wire harness (not shown) having a plurality of wire members bound as a bundle, and the end portion of the wire member 10 is shown in each figure. That is, the wire member 10 may be a branched wire of the wire harness described in Related Art.

Figure 3:
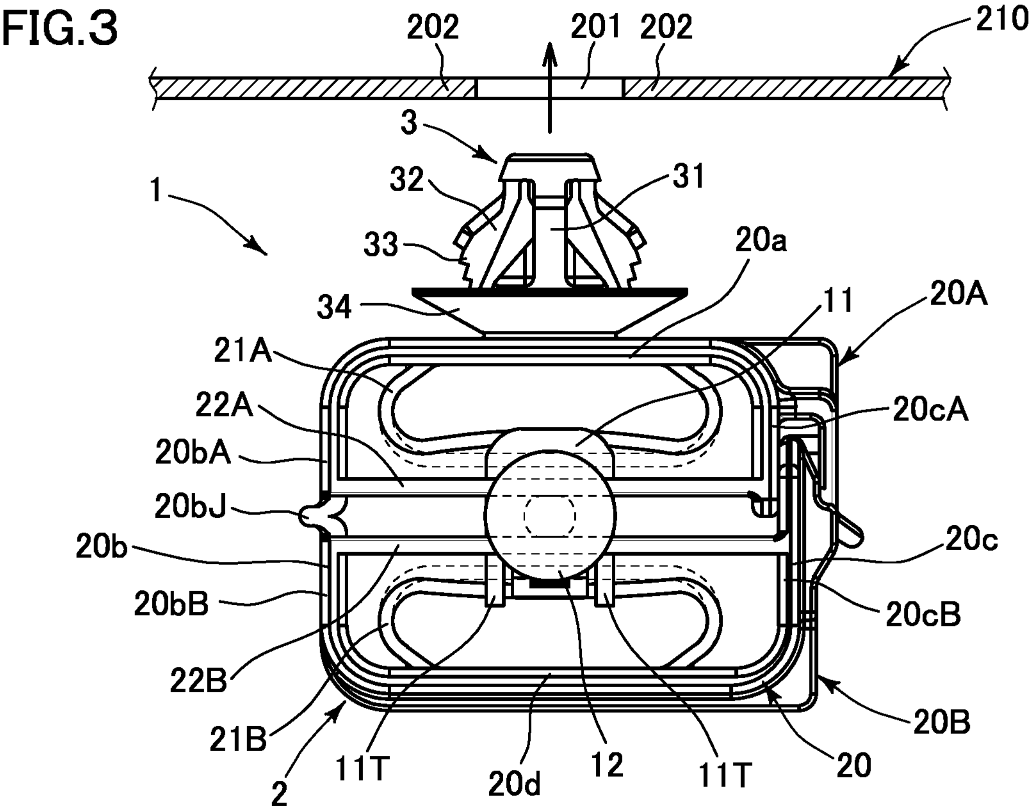
FIG. 3 is an explanatory drawing illustrating a state where the connector mounting member has not been mounted to a counterpart component.
Figure 4:
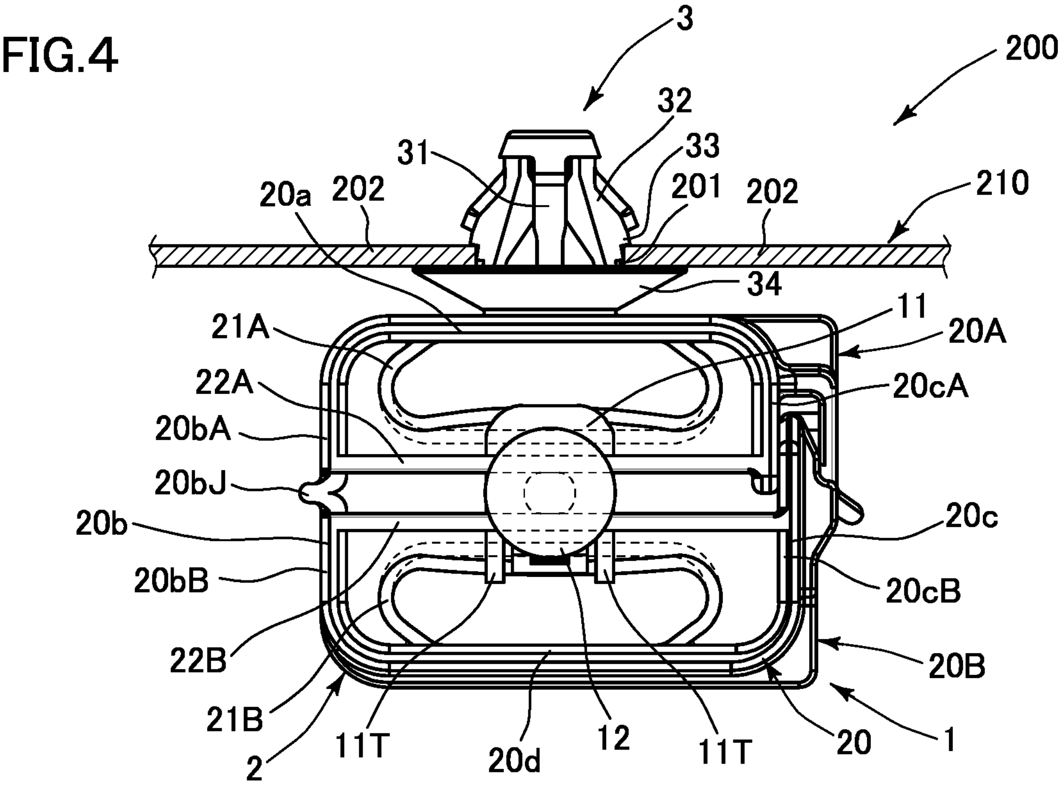
FIG. 4 is an explanatory drawing illustrating a state where the connector mounting member has been mounted to the counterpart component.

In the description herein, the counterpart component 210 is a panel member disposed in a vehicle, and can be, for example, a vehicle panel member and interior member such as an instrument panel, a door trim, and a deck side trim as shown in FIG. 3 and FIG. 4. Furthermore, the counterpart component 210 is not limited to the vehicle panel member and interior member described above, and is not limited to a panel member. In the description herein, the counterpart component 210 is a panel member having a through hole 201, and the connector mounting member 1 is fixed to the counterpart component 210 by inserting the mounting portion 3 in the through hole 201.

The mounting portion 3 integrally has a support column 31, an elastic piece 32 that extends from the leading end of the support column 31 toward a base end thereof and that can be elastically deformed so as to approach the support column 31, a lock-engagement portion 33 disposed at the end of the elastic piece 32, and a press-up portion 34 that spreads from the base end side of the support column 31 toward the leading end thereof so as to be dish-shaped. As shown in FIG. 3, the mounting portion 3 is inserted in the through hole 201 from the leading end of the support column 31, and passes therethrough such that the elastic piece 32 is elastically deformed so as to approach the support column 31, and the elastic piece 32 is elastically restored after having passed therethrough, and the lock-engagement portion 33 is moved around the through hole 201 toward the depth side in the insertion direction and lock-engaged with an opening peripheral portion 202 near the through hole 201 so as to prevent disengagement as shown in FIG. 4. Meanwhile, the dish-shaped press-up portion 34 is not inserted in the through hole 201, and comes into contact with the opening peripheral portion 202 near the through hole 201 at the front side in the insertion direction. Thus, the mounting portion 3 is inserted in the through hole 201 and mounted to the counterpart component 210 so as to hold the opening peripheral portion 202 between the lock-engagement portion 33 and the press-up portion 34. Thus, a mounted structure 200 in which the connector mounting member 1 is mounted to the counterpart component 210, is formed (see FIG. 4).

The mounting portion 3 is not limited to the above-described one, and may be any portion, such as a bolt or a bracket, for mounting the connector mounting member 1 to the counterpart component 210. The through hole 201 is not limited to such a hole, and may be any portion corresponding to the mounting portion 3.

As shown in FIG. 1, the holding portion 2 has an annular frame 20, opposing elastic portions 21A, 21B, and opposing positioning portions 22A, 22B. The opposing elastic portions 21A, 21B are formed as a connector holding portion, and oppose each other in the frame 20 in the up-down direction, are elastically deformed so as to widen the opposing distance in the up-down direction between the opposing elastic portions 21A and 21B opposing each other, and can thus press-hold the connector 11 therebetween. The opposing positioning portions 22A, 22B are formed as a wire holding portion, and oppose each other in at least one opening, that is, an opening 20H1 (see FIG. 6) of the frame 20, and can press-hold the wire portion 12 extending from the connector 11 that is press-held between the opposing elastic portions 21A and 21B, between the opposing positioning portions 22A and 22B opposing each other (see FIG. 2 and FIG. 6). The opposing distance between the opposing positioning portions 22A and 22B is shorter than the opposing distance between the opposing elastic portions 21A and 21B, and is less easily widened by elastic deformation than the opposing distance between the opposing elastic portions 21A and 21B.

The frame 20 has a substantially quadrangular tubular cross-section, and integrally has an upper face portion 20*a*, left and right side face portions 20*b*, 20*c*, and a lower face portion 20*d*, as shown in FIG. 3. The mounting portion 3 is formed so as to protrude at the side face portion (in the description herein, the upper face portion 20*a*) forming one of four sides of the substantially quadrangular cross-section. The mounting portion 3 may be formed at another position as long as the mounting portion 3 protrudes outward from the frame 20.

Figure 2:
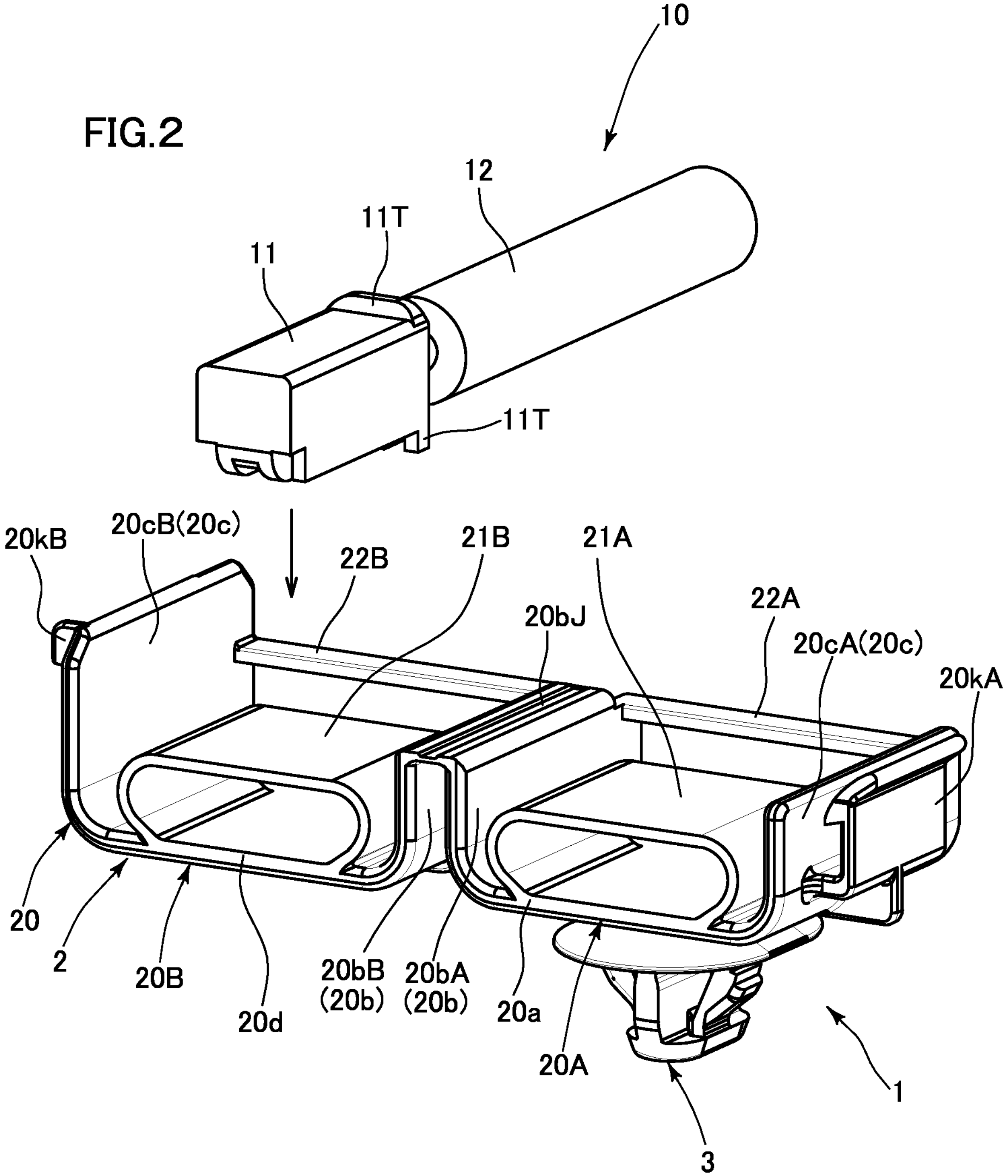
FIG. 2 is a perspective view showing a state before the connector mounting member of the first embodiment holds a connector.

As shown in FIG. 1 and FIG. 2, the frame 20 is a tubular (annular) frame that is dividable into two portions and thus opened/closed, and has a first frame portion 20A on the upper side and a second frame portion 20B on the lower side. One end portion of the first frame portion 20A and one end portion of the second frame portion 20B are connected to each other by a hinge 20*b*J, and the other end portions of both of them can be combined by combining portions 20*k*A and 20*k*B (see FIG. 5). In the cross-sectional view of FIG. 5, the counterpart component in FIG. 4 is omitted.

Figure 5:
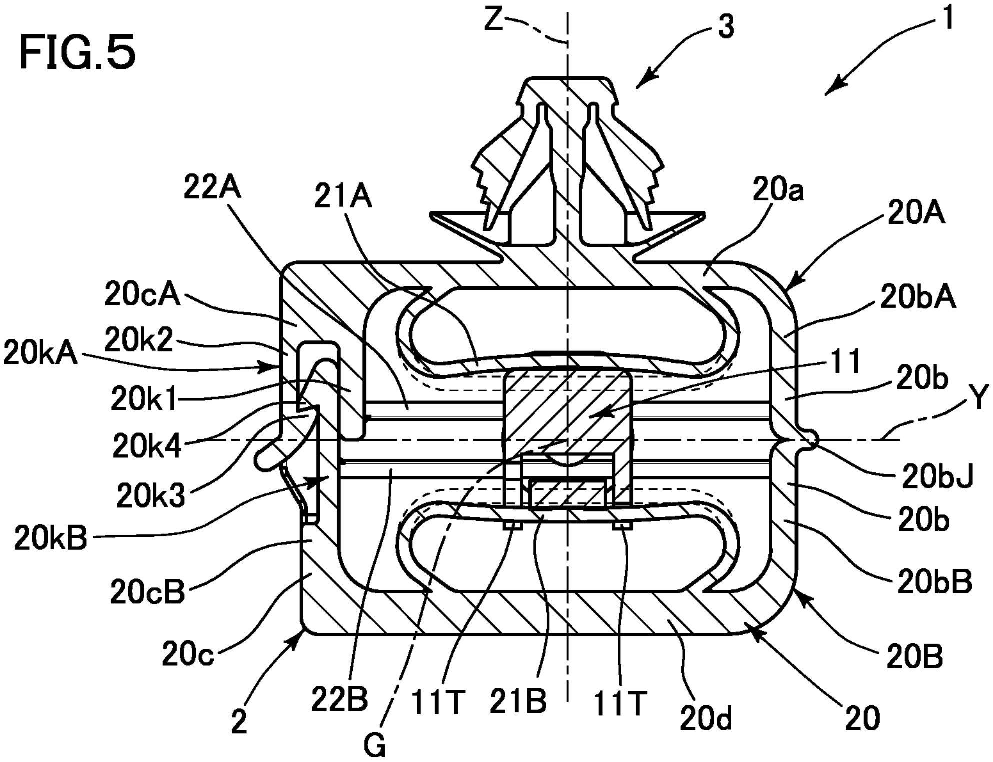
FIG. 5 is a cross-sectional view of the connector mounting member in FIG. 4 as taken in the direction orthogonal to a frame penetrating direction.

As shown in FIG. 3 to FIG. 5, the first frame portion 20A has a U-like shape that has the upper face portion 20*a*, a combining-side end portion 20*c*A forming the side face portion 20*c*, and an end portion 20*b*A (hereinafter, referred to as a hinge-side end portion 20*b*A), on the hinge 20*b*J side, forming the side face portion 20*b*, and the first combining portion 20*k*A forming one of the combining portions 20*k*A, 20*k*B is disposed at the combining-side end portion 20*c*A. Meanwhile, the second frame portion 20B has a U-like shape that has the lower face portion 20*d*, a combining-side end portion 20*c*B forming the side face portions 20*c*, and an end portion 20*b*B (hereinafter, referred to as a hinge-side end portion 20*b*B), on the hinge 20*b*J side, forming the side face portion 20*b*, and the second combining portion 20*k*B forming the other of the combining portions 20*k*A, 20*k*B is disposed at the combining-side end portion 20*c*B.

As shown in FIG. 5, in the description herein, the first combining portion 20*k*A is an engaging recess, and the second combining portion 20*k*B is a lock-engaging claw portion. The first combining portion 20*k*A as the engaging recess is a recess that is opened downward between an inner wall portion 20*k*1 disposed on the inner side and an elastic lock-engagement wall portion 20*k*2 disposed on the outer side so as to oppose each other. The second combining portion 20*k*B oriented upward can be inserted through the opened portion. During the insertion, the elastic lock-engagement wall portion 20*k*2 of the first combining portion 20*k*A is elastically deformed such that the lower end side portion of the elastic lock-engagement wall portion 20*k*2 is press-widened outwardly by an end claw portion 20*k*4 of the second combining portion 20*k*B. The elastic lock-engagement wall portion 20*k*2 has, on the lower end side, a lock-engagement portion 20*k*3 protruding inwardly, and is elastically restored according to the end claw portion 20*k*4 of the inserted second combining portion 20*k*B moving over the lock-engagement portion 20*k*3, and the lock-engagement portion 20*k*3 is lock-engaged with the end claw portion 20*k*4 so as to prevent disengagement. Thus, the first combining portion 20*k*A and the second combining portion 20*k*B are combined to form the frame 20 in an annular shape.

As shown in FIG. 1 to FIG. 5, the opposing elastic portions 21A, 21B include an upper elastic portion 21A that can be elastically deformed so as to move the lower end side portion upward, and a lower elastic portion 21B that is disposed on the lower side in the frame 20, and can be elastically deformed so as to move the upper end side portion downward. In the description herein, the opposing elastic portions 21A and 21B are each formed in a tubular shape that has a substantially rectangular cross-section so as to be connected to inner walls on the corresponding sides of the upper face portion 20*a* and the lower face portion 20*d*, respectively, of the frame 20, and so as to include the corresponding sides of the upper face portion 20*a* and the lower face portion 20*d* (see FIG. 2). Each of the opposing elastic portions 21A and 21B is connected merely to a corresponding one of the upper face portion 20*a* and the lower face portion 20*d*, and is not influenced by another portion when elastically deformed as described above, and can thus be easily elastically deformed.

Specifically, as shown in FIG. 5, in the description herein, the upper elastic portion 21A is elastically deformed so as to be collapsed in the up-down direction Z by moving the lower end side portion upward, and is deformed so as to be spread in the left-right direction Y (may also be referred to as a width direction) during the upward movement. Similarly, the lower elastic portion 21B is also elastically deformed so as to be collapsed in the up-down direction Z by moving the upper end side portion downward, and is deformed so as to be spread in the left-right direction Y during the downward movement. Therefore, the frame 20 has a gap that allows the upper elastic portion 21A and the lower elastic portion 21B to be spread in the left-right direction Y. The left-right direction Y is a direction orthogonal to both a penetration direction X (see FIG. 6) of the frame 20, and the up-down direction Z. In the cross-sectional view of FIG. 6, the counterpart component in FIG. 4 is omitted.

As shown in FIG. 3 and FIG. 4, the opposing positioning portions 22A, 22B are formed so as to connect between opposing two positions of the edge portion of the opening 20H1 in at least one opening, that is, the opening 20H1 (in this case, merely in the opening 20H1: see FIG. 6) of the frame 20 such that each of the opposing positioning portions 22A and 22B bridge the opening 20H1. In the description herein, the opposing positioning portions 22A, 22B are linear plate-like portions that linearly extend so as to be parallel to each other, and include, as shown in FIG. 2, a first plate-like portion 22A that connects between the hinge-side end portion 20*b*A and the combining-side end portion 20*c*A of the first frame portion 20A, and a second plate-like portion 22B that connects between the hinge-side end portion 20*b*B and the combining-side end portion 20*c*B of the second frame portion 20B.

The opposing positioning portions 22A, 22B are influenced by stiffness of the first frame portion 20A and the second frame portion 20B when elastic deformation such as flection occurs. For example, in a case where the opposing positioning portions 22A, 22B that linearly extend are pushed upward at the centers thereof, deformation such as flection may occur also in the first frame portion 20A and the second frame portion 20B. Therefore, the opposing positioning portions 22A, 22B are less likely to be elastically deformed than the opposing elastic portions 21A, 21B that are not influenced by another portion and can be elastically deformed merely by themselves. Accordingly, in a case where the wire portion 12 is press-held between the opposing positioning portions 22A and 22B, the press-holding force is high and the wire portion 12 can be held so as to be positioned. Thus, the position of the wire portion 12 is fixed, whereby the opposing elastic portions 21A, 21B can more stably hold the connector 11. The opposing positioning portions 22A, 22B can also act to prevent the connector 11 from being removed from the opening 20H1 (see FIG. 6).

Furthermore, the opposing elastic portions 21A, 21B and the opposing positioning portions 22A, 22B satisfy a positional relationship in which the opposing positioning portions 22A, 22B that are not elastically deformed (broken lines) seem to pass between the opposing elastic portions 21A and 21B that oppose each other and are not elastically deformed (broken lines), without overlapping the opposing elastic portions 21A, 21B, as viewed in the penetration direction X of the frame 20 (see FIG. 3 and FIG. 4). In other words, in this positional relationship, when the opposing elastic portions 21A, 21B and the opposing positioning portions 22A, 22B each of which is not elastically deformed are projected on a plane orthogonal to the penetration direction X of the frame 20, the opposing positioning portions 22A, 22B that are projected extend between the opposing elastic portions 21A and 21B that are also projected and that oppose each other, without overlapping the opposing elastic portions 21A, 21B. Thus, the wire portion 12 extending from the connector 11 that is press-held between the opposing elastic portions 21A and 21B can be easily press-held between the opposing positioning portions 22A and 22B. In a case where the positional relationship is satisfied, the opposing positioning portions 22A, 22B can hold the wire portion 12 therebetween without applying such a load as to, for example, greatly bend the wire portion 12.

As shown in FIG. 6, the frame 20 has a wire side section S2 in which an internal space is spread on the outer circumferential side as compared with a connector holding section S1 in which the opposing elastic portions 21A, 21B are formed, on the opposing positioning portions 22A, 22B side in the penetration direction X in the frame 20. In the description herein, in the wire side section S2, the opposing elastic portions 21A, 21B are not formed and the internal space is thus spread on the outer circumferential side. In the wire side section S2, for example, a protrusion 11T (connector protrusion) that is disposed on the wire extending side of the connector 11 that is press-held between the opposing elastic portions 21A and 21B, so as to protrude outward, can be stored. At the rear end portion (end portion on the wire portion extending side) of the connector 11, the protrusion 11T that protrudes outward so as to prevent the connector 11 from being excessively inserted is disposed in many cases. In the present embodiment, the protrusion 11T is not held between the opposing elastic portions 21A and 21B, and can be stored in the internal space (connector protrusion storing space) of the wire side section S2 so as not to interfere with the opposing elastic portions 21A, 21B.

Thus, in the connector mounting member 1, the wire member 10 having the connector 11 and the wire portion 12 as shown in FIG. 1 to FIG. 6 can be held. A procedure for holding the connector 11 and the wire portion 12 will be described below.

Firstly, as shown in FIG. 2, the first frame portion 20A and the second frame portion 20B are prepared in an uncombined state where the first frame portion 20A and the second frame portion 20B are opened (a state where the first combining portion 20*k*A and the second combining portion 20*k*B are not combined with each other).

Subsequently, the connector 11 is placed on one (21B in FIG. 2) of the opposing elastic portions 21A, 21B, and the wire portion 12 is placed on the opposing positioning portion (22B in FIG. 2) disposed at the frame portion (the second frame portion 20B in FIG. 2) having the one of the opposing elastic portions 21A, 21B. In this case, a portion of the wire portion 12 in which the wire 12A (see FIG. 6) is exposed on the connector 11 side is placed on the opposing positioning portion (22B in FIG. 2). A position at which the connector 11 is placed is adjusted in the penetration direction X, and the protrusion 11T is stored in the wire side section S2.

In this state, for covering the connector 11 with the other (21A in FIG. 2) of the opposing elastic portions 21A, 21B, the frame portion (20A in FIG. 2) having the other of the opposing elastic portions 21A, 21B is rotated around the hinge 20*b*J. Thus, the combining portions 20*k*A, 20*k*B of both the frame portions 20A, 20B are moved close to each other, and the combined state (see FIG. 1) as described above is obtained.

Thus, the connector 11 is press-held between the opposing elastic portions 21A and 21B by elastically deforming the opposing elastic portions 21A and 21B, and the wire portion 12 (in this case, the wire 12A) extending from the connector 11 that is press-held therebetween is press-held and positioned between the opposing positioning portions 22A and 22B (see FIG. 5 and FIG. 6).

The opposing positioning portions 22A, 22B may press-hold the wire 12A therebetween. Alternatively, the opposing positioning portions 22A, 22B may press-hold the wire 12A therebetween so as to press-deform the protective member 12B at the protective member 12B portion.

Figure 7:
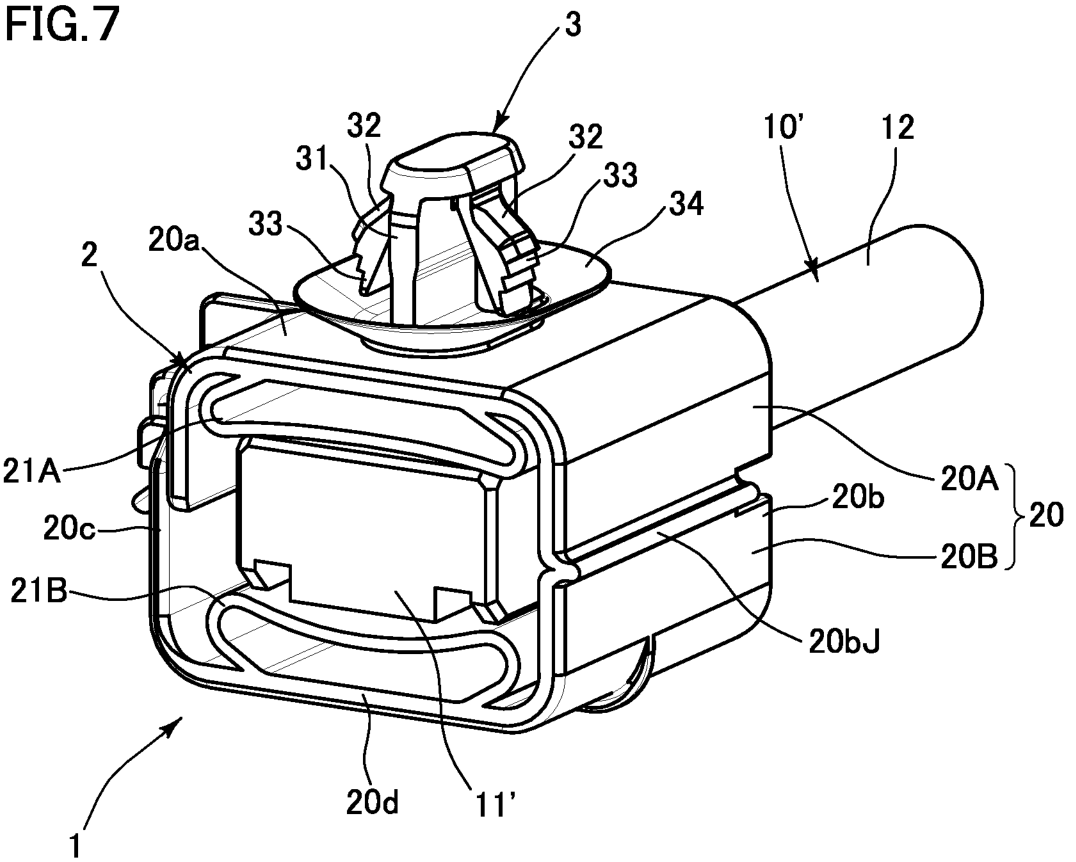
FIG. 7 is a perspective view showing a state where a connector other than that in FIG. 1 is held.
Figure 8:
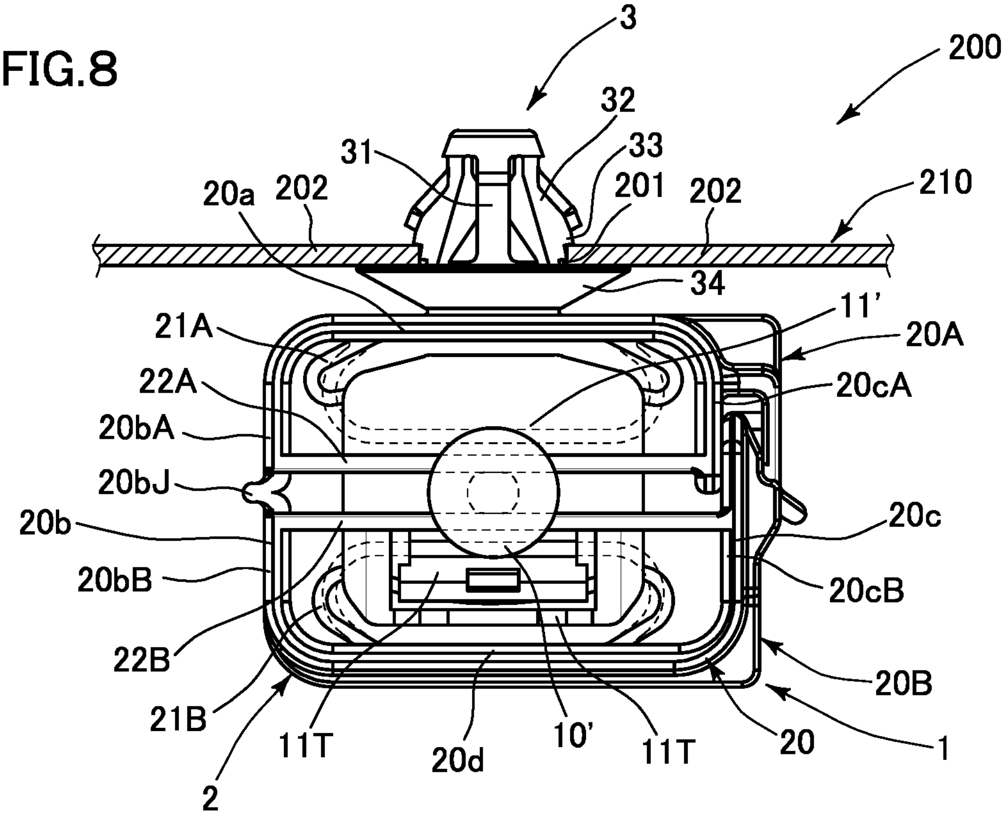
FIG. 8 is an explanatory diagram illustrating a state where the connector mounting member holds the other connector in FIG. 7 and is mounted to a counterpart component.
Figure 9:
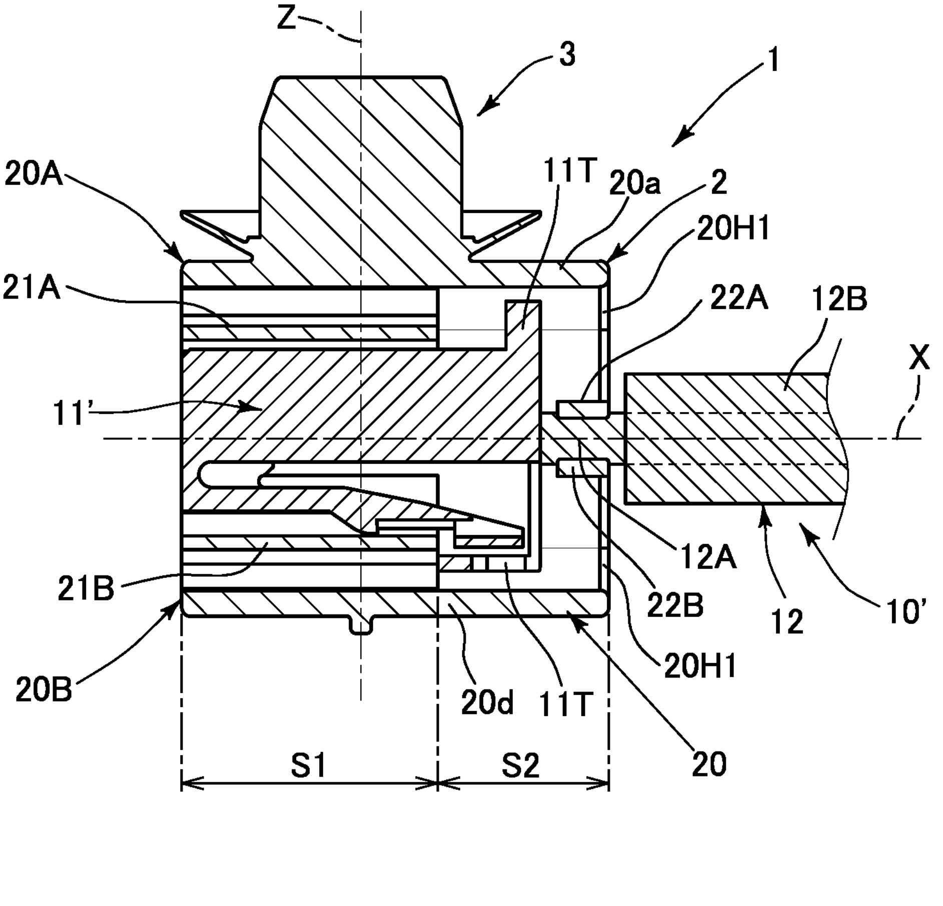
FIG. 9 is a central cross-sectional view of the connector mounting member in FIG. 8.
Figure 10:
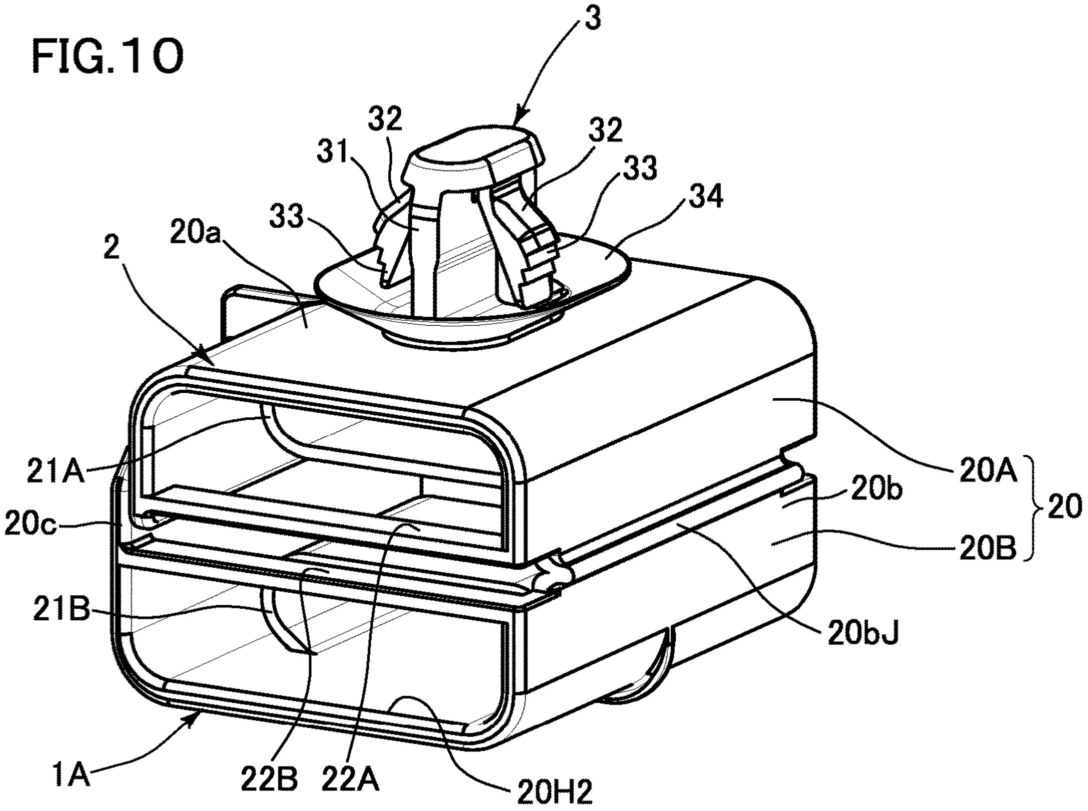
FIG. 10 is a perspective view of a connector mounting member according to a second embodiment.
Figure 11:
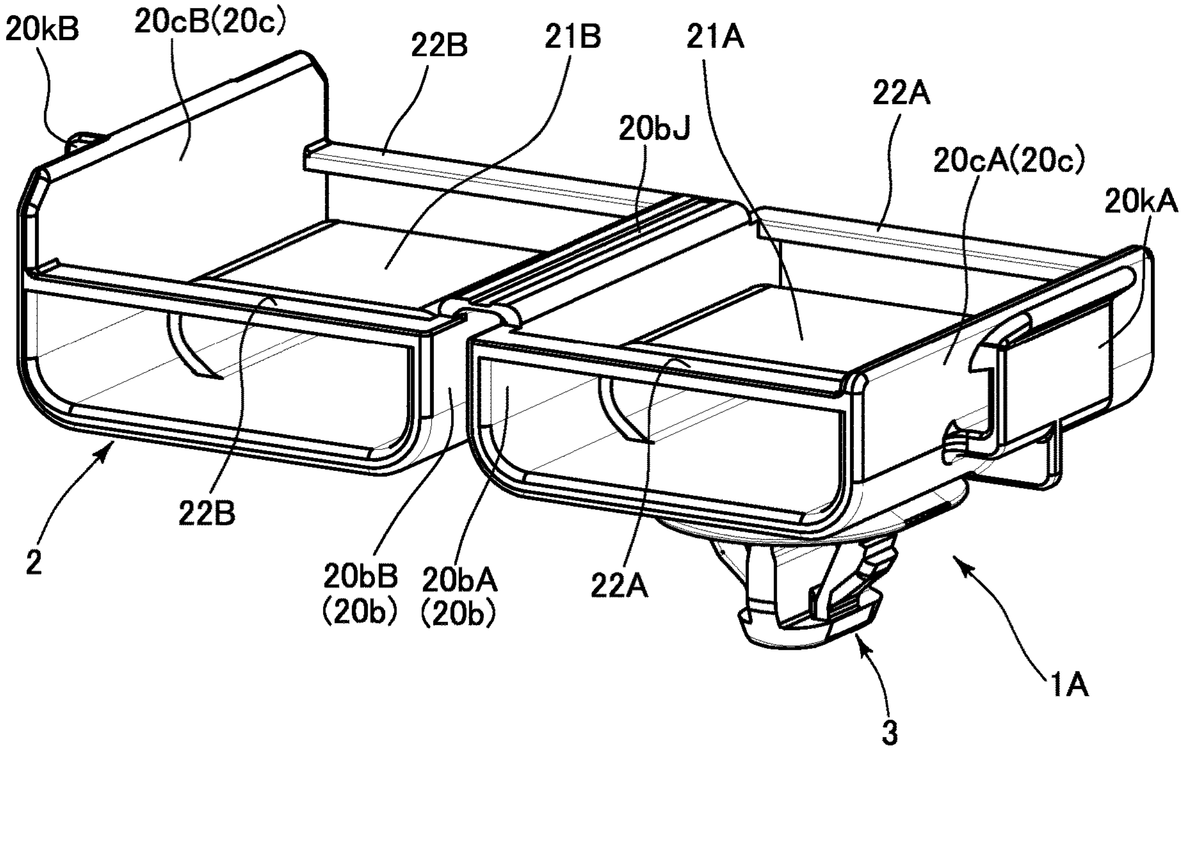
FIG. 11 is a perspective view showing a state before the connector mounting member of the second embodiment holds a connector.

The connector mounting member 1 can also hold a wire member that includes a wire portion and a connector having a shape and a size different from those of the connector 11 in a manner similar to that for the wire member 10 (the connector 11 and the wire portion 12) shown in FIG. 1 to FIG. 6. For example, a connector 11' having a size greater than the connector 11 is mounted to the end of the wire portion 12, in a wire member 10' shown in FIG. 7 to FIG. 9. In this case, the connector 11' can be similarly press-held between the opposing elastic portions 21A and 21B of the holding portion 2 by elastically deforming the opposing elastic portions 21A, 21B, and the other manner for holding the wire member is also the same as for the wire member 10 described above. However, the greater size of the connector 11' increases the elastic deformation of the opposing elastic portions 21A, 21B.

Although one embodiment of this invention has been described above, the embodiment is merely illustrative. This invention is not limited to the embodiment, and various modifications such as additions and omissions may be made based on the knowledge of a person skilled in the art without departing from the gist of the claims.

Hereinafter, embodiments other than the above-described embodiment and modifications of the embodiments will be described. Portions having the same functions as those in the above-described embodiment are designated by the same reference characters and the detailed description thereof is omitted. In addition, the above-described embodiment and the following modifications and other embodiments may be combined to be implemented as appropriate as long as no technical contradiction arises.

In the above-described embodiment, the hinge 20*b*J side portions of the first frame portion 20A and the second frame portion 20B may also be implemented by combining portions that can be combined with each other. In this case, the first frame portion 20A and the second frame portion 20B are provided as separate portions, and the combining portions disposed at both ends of the first frame portion 20A and the combining portions disposed at both ends of the second frame portion 20B are combined to form the frame 20 in an annular shape.

In the above-described embodiment, the opposing positioning portions 22A, 22B may be formed in the other opening of the frame 20 as well as the at least one opening, that is, the opening 20H1 of the frame 20.

Figure 12:
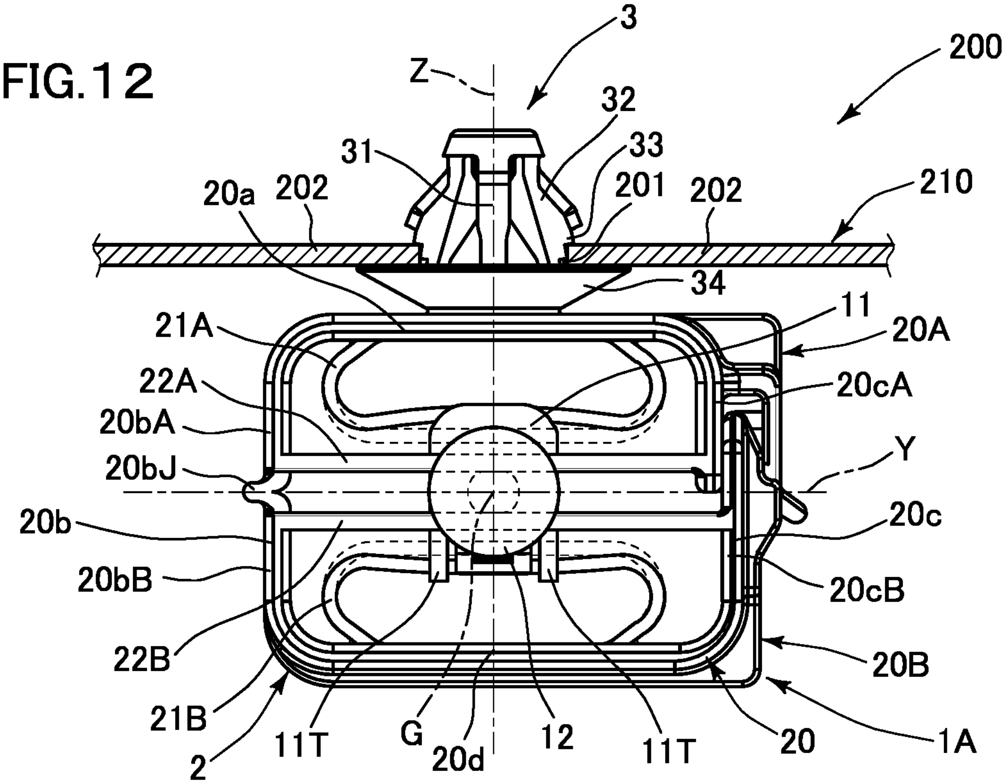
FIG. 12 is an explanatory diagram illustrating a state where the connector mounting member of the second embodiment holds the connector in FIG. 1 and is mounted to a counterpart component.
Figure 13:
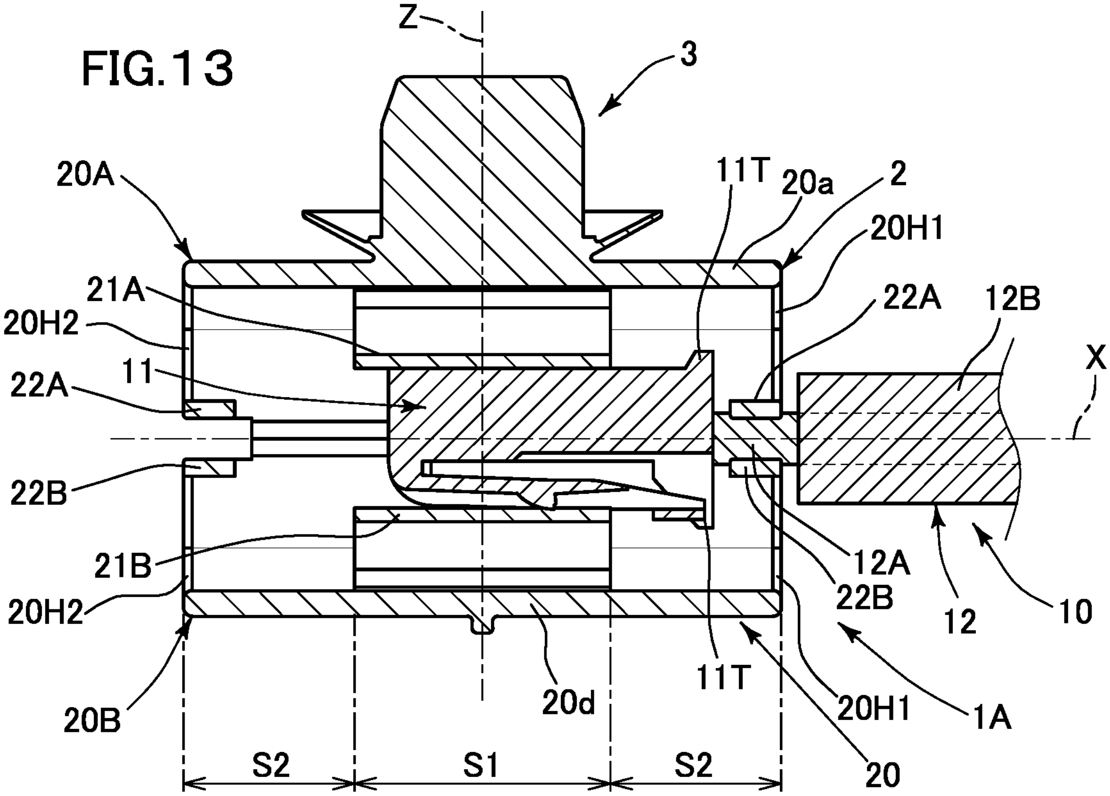
FIG. 13 is a central cross-sectional view of the connector mounting member in FIG. 12.
Figure 14:
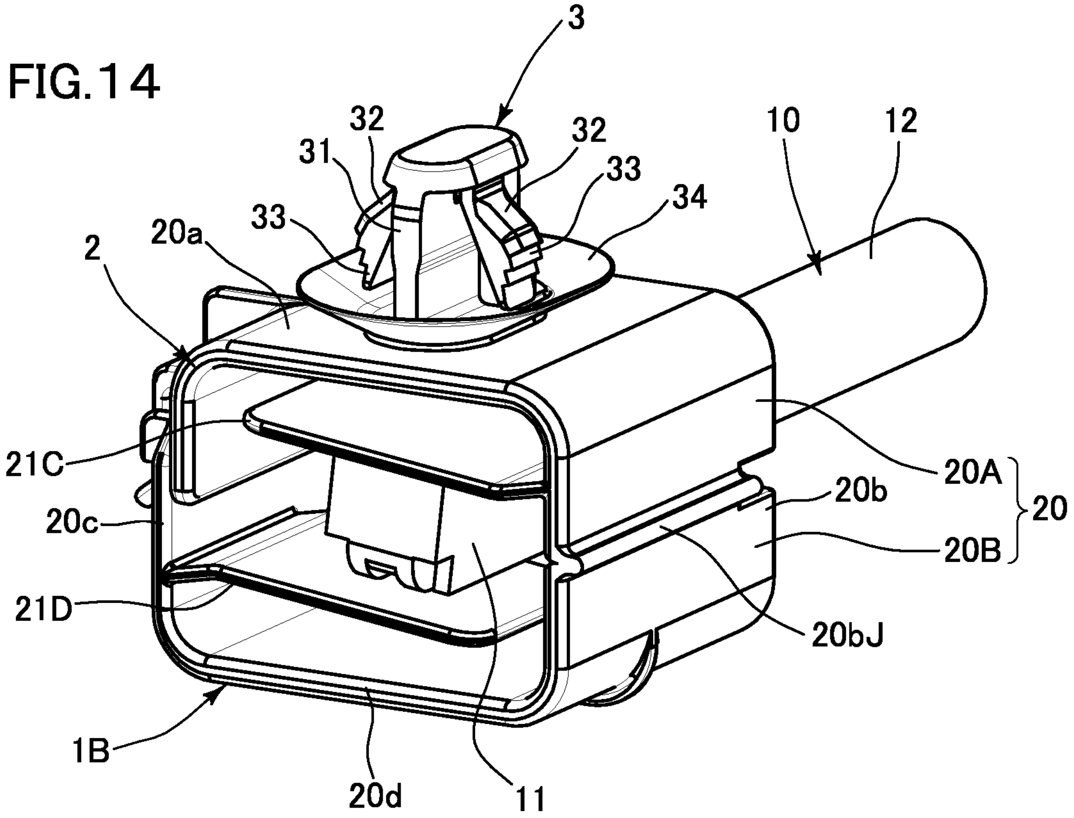
FIG. 14 is a perspective view showing a state where a connector mounting member according to a third embodiment holds a connector.
Figure 15:
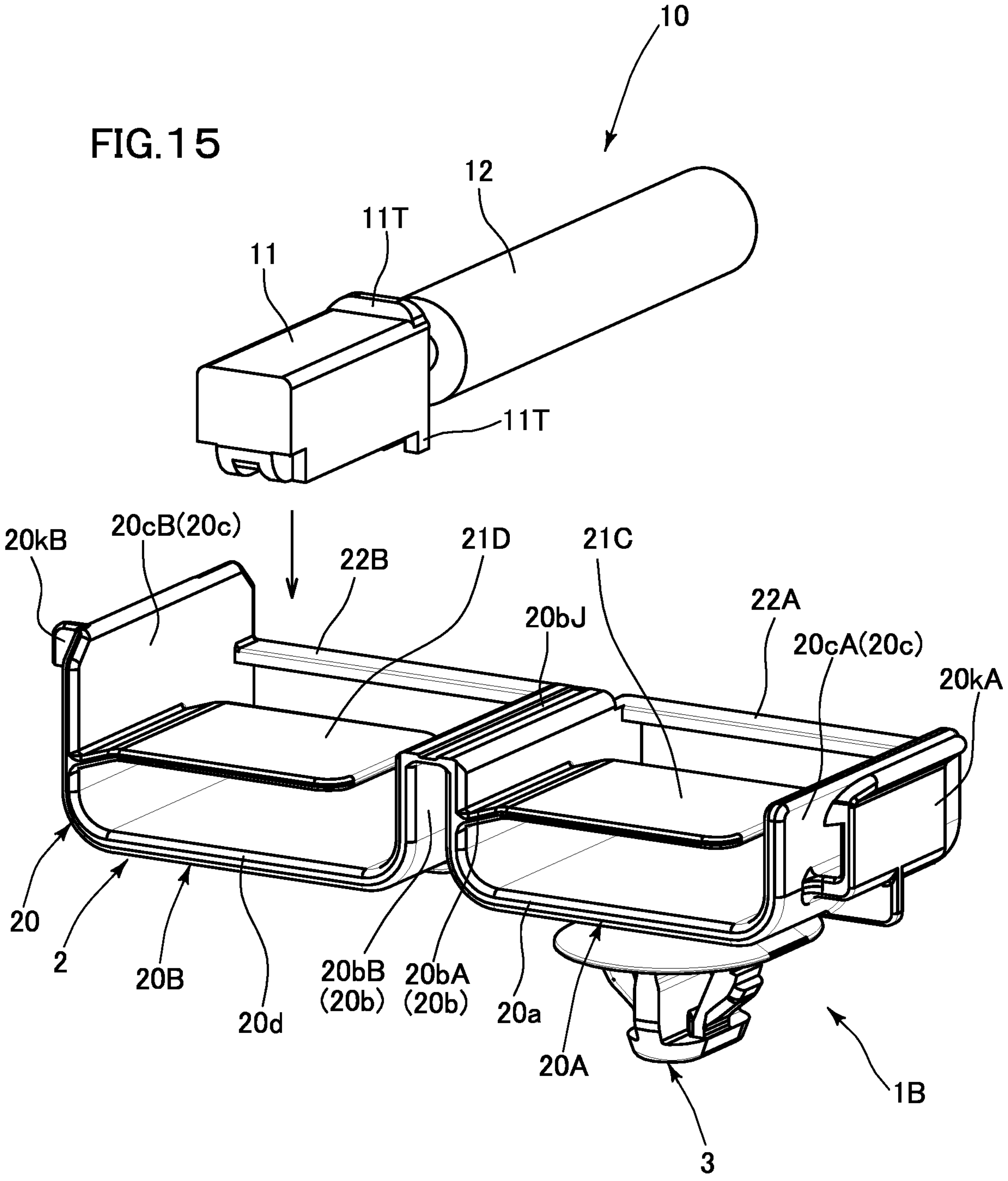
FIG. 15 is a perspective view showing a state before the connector mounting member of the third embodiment holds the connector.

For example, in a connector mounting member 1A shown in FIG. 10 to FIG. 13, the wire portion 12 extending from the connector 11 that is press-held between the opposing elastic portions 21A and 21B can be press-held between the opposing positioning portions 22A and 22B in not only one opening 20H1 but also the other opening 20H2 (see FIG. 10 and FIG. 13), and the opposing positioning portions 22A, 22B can be formed such that the opposing distance therebetween is less easily widened by elastic deformation than the opposing distance between the opposing elastic portions 21A and 21B, and the wire portion 12 extending from the connector 11 that is press-held between the opposing elastic portions 21A and 21B can be press-held between the opposing positioning portions 22A and 22B that oppose each other (see FIG. 12 and FIG. 13). The broken lines in FIG. 12 indicate the opposing elastic portions 21A, 21B that have not been elastically deformed.

In this case, the wire side section S2 in which an internal space is spread on the outer circumferential side as compared with the connector holding section S1 in which the opposing elastic portions 21A, 21B are formed, may be formed also on the other opening 20H2 side. The connector mounting member 1A having such a structure can press-hold the connector 11' or another connector between the opposing elastic portions 21A and 21B, and can press-hold the wire portion 12 between the opposing positioning portions 22A and 22B as in the embodiments described above.

In the above-described embodiment, the opposing elastic portions 21A, 21B may have other shapes.

Figure 16:
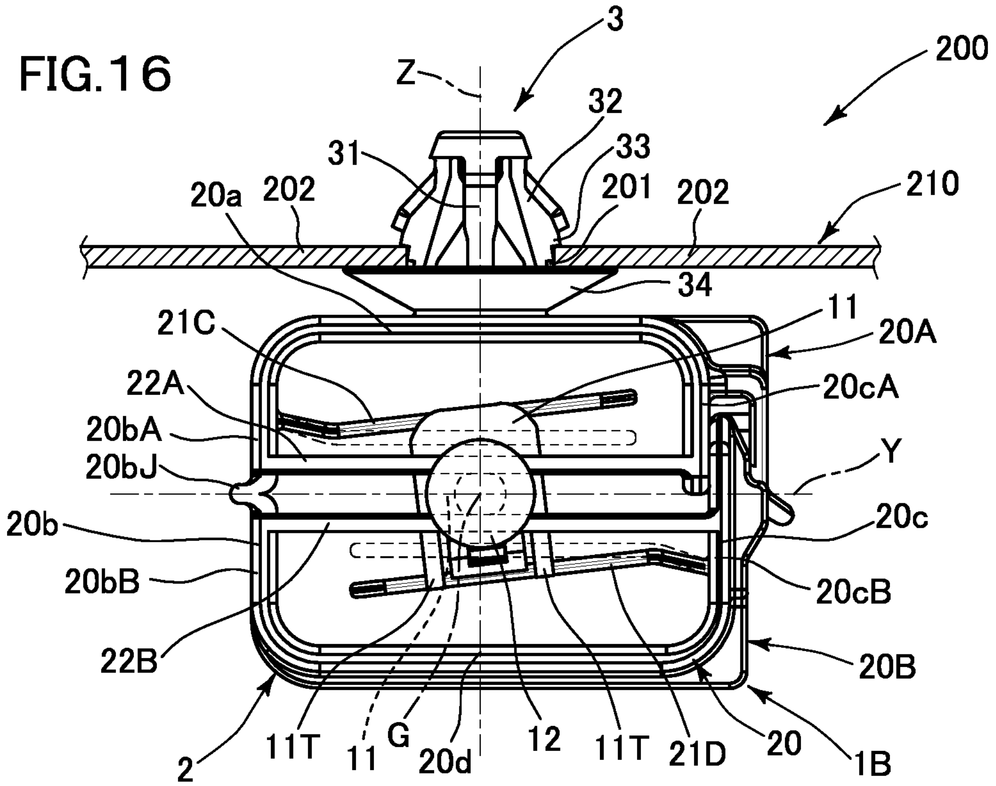
FIG. 16 is an explanatory diagram illustrating a state where the connector mounting member of the third embodiment holds the connector in FIG. 1 and is mounted to a counterpart component.
Figure 17:
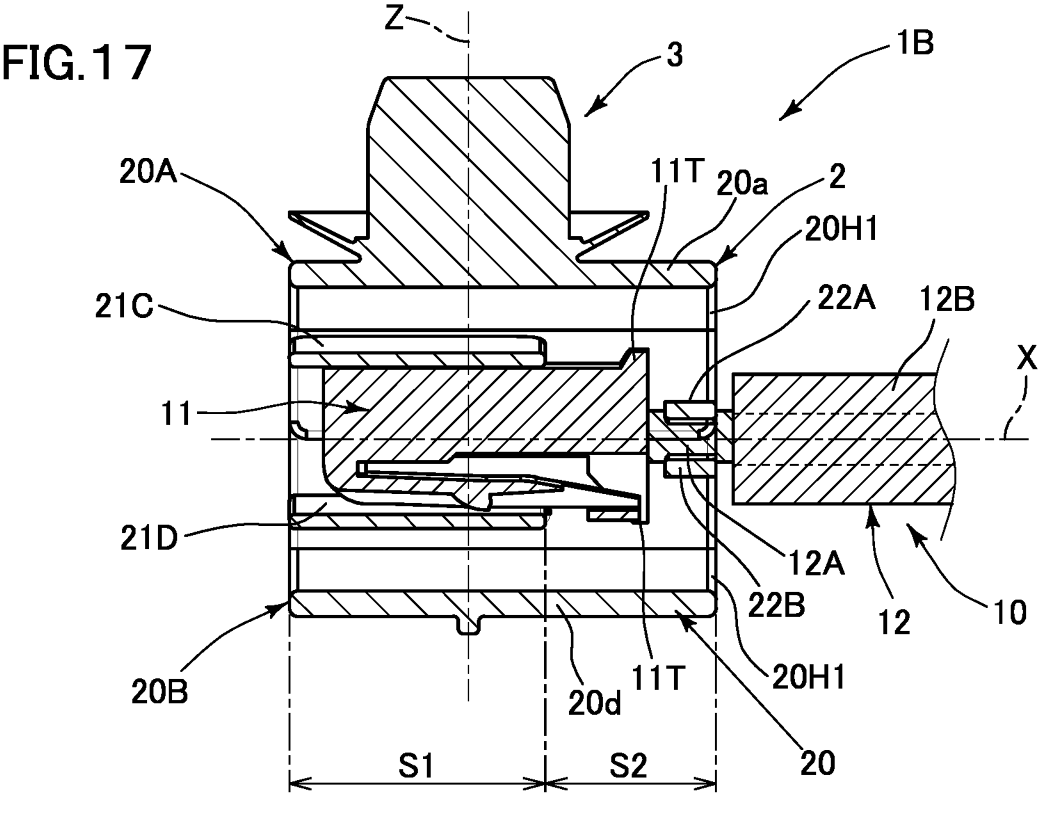
FIG. 17 is a central cross-sectional view of the connector mounting member in FIG. 16.
Figure 18:
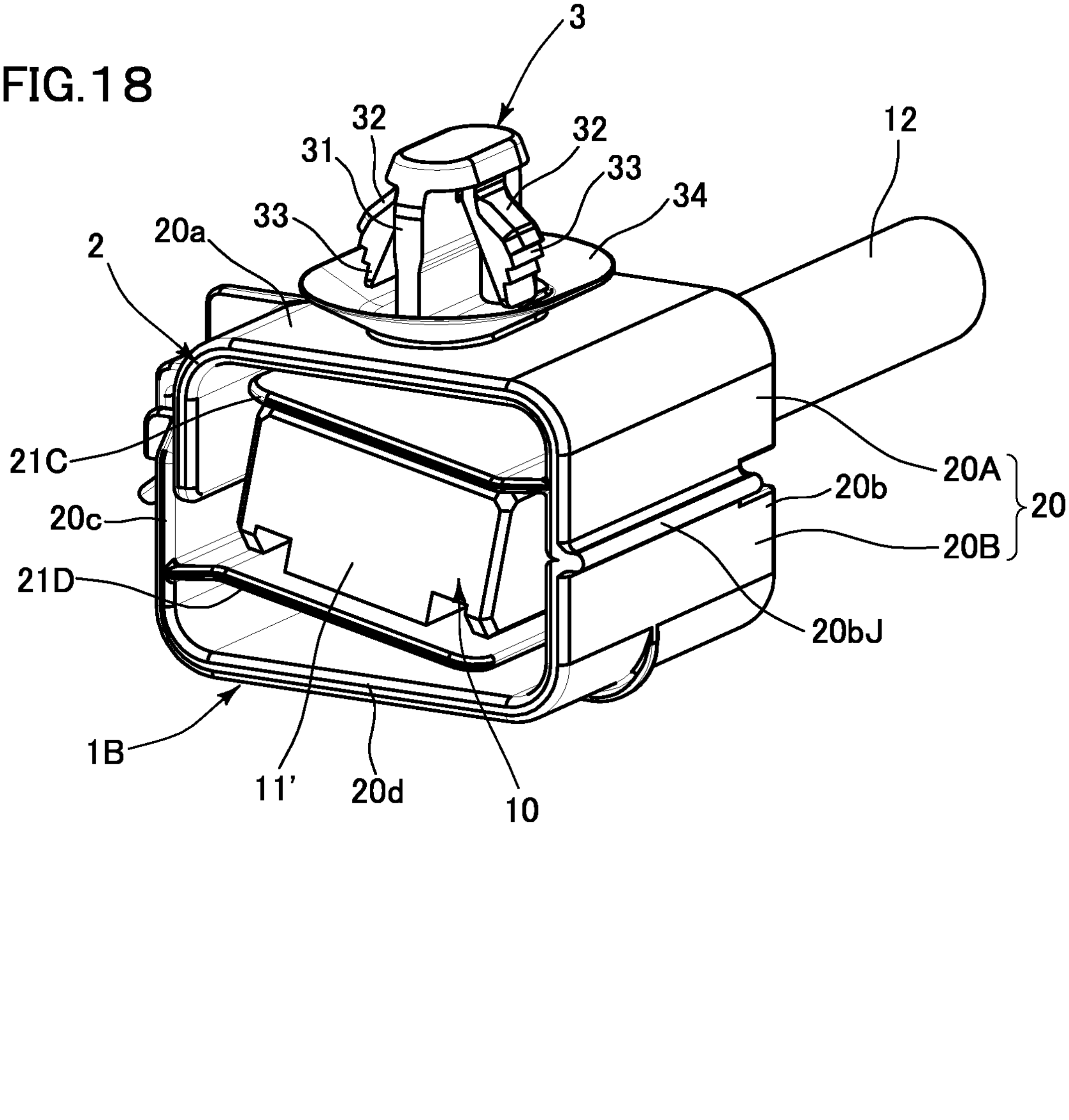
FIG. 18 is a perspective view showing a state where the connector mounting member of the third embodiment holds the other connector shown in FIG. 7.

For example, in a connector mounting member 1B shown in FIG. 14 to FIG. 18, the opposing elastic portions 21A, 21B may be formed as opposing elastic portions that include an upper elastic piece 21C extending from an inner wall of the frame 20 in the left-right direction Y so as to form a gap between the upper elastic piece 21C and the upper face portion 20*a* of the frame 20, and a lower elastic piece 21D extending from the inner wall of the frame 20 in the left-right direction Y so as to form a gap between the lower elastic piece 21D and the lower face portion 20*d* of the frame 20. The elastic piece 21C, 21D can allow the end side portion to be elastically deformed in the up-down direction by using, as a fulcrum, the base end side portion connected to the frame 20, as shown in FIG. 16 (the broken lines in FIG. 16 indicate a state before the elastic deformation), so that the connectors 11, 11' having various shapes as shown in, for example, FIG. 14 and FIG. 18 can be press-held between the opposing elastic pieces 21C and 21D. In the present embodiment, the upper elastic piece 21C extends from one of the left and right side face portions 20*b*, 20*c* toward the other thereof (from the side face portion 20*b* toward the side face portion 20*c* in FIG. 14 to FIG. 18), and the lower elastic piece 21D extends from the other of the left and right side face portions 20*b*, 20*c* toward the one thereof (from the side face portion 20*c* toward the side face portion 20*b* in FIG. 14 to FIG. 18), and both the upper elastic piece 21C and the lower elastic piece 21D form a rotation-symmetrical shape when projected on a projection plane orthogonal to the penetration direction X as shown in FIG. 16. Thus, the connector (for example, the connector 11, 11') that is press-held between the upper elastic piece 21C and the lower elastic piece 21D does not deviate leftward, rightward, upward, and downward in the frame 20, and can be press-held therebetween at the center of the frame 20. Furthermore, the wire portion 12 extending from the connector is also structured to extend rearward from the center of the frame 20, so that the wire portion 12 can be easily press-held, without difficulty, between the opposing positioning portions 22A and 22 formed in the same manner as in the above-described embodiment.

In the above-described embodiment, the opposing positioning portions 22A, 22B are each structured to have both ends connected to the frame 20, and are thus formed such that the opposing distance therebetween is less easily widened by elastic deformation than the opposing distance between the opposing elastic portions 21A and 21B (or 21C and 21D). However, the opposing positioning portions 22A, 22B may be formed such that the opposing distance therebetween is not easily widened by another method. For example, stiffness of the opposing positioning portions 22A, 22B themselves may be made higher than stiffness of the opposing elastic portions 21A, 21B (or 21C, 21D), by, for example, forming the opposing positioning portions 22A, 22B to have L-shaped cross-sections.

In the above-described embodiment, a positional relationship between the opposing elastic portions 21A and 21B and the opposing positioning portions 22A and 22B is not limited to the above-described positional relationship. The opposing elastic portions 21A and 21B and the opposing positioning portions 22A and 22B may be at least positioned so as to oppose each other across the centroid G (see FIG. 5, FIG. 12, and FIG. 16) of the opening region of the frame 20 as viewed in the penetration direction X of the frame 20. Also in a case where this condition is satisfied, both the connector (for example, the connector 11, 11') and the wire portion 12 extending from the connector can be easily press-held without difficulty. The positional relationship is satisfied in all of the above-described embodiments.

In the above-described embodiment, the wire portion 12 is the same between the wiring members 10 and 10'. However, a wire portion different from the above-described wire portion, for example, a wire portion having a different diameter may be used as long as the wire portion can be press-held between the opposing positioning portions 22A and 22B that oppose each other.

DESCRIPTION OF THE REFERENCE CHARACTERS

1, 1A, 1B connector mounting member
10, 10' wire member
11, 11' connector
12 wire portion
2 holding portion

20 frame
21A, 21B opposing elastic portion
21C, 21D opposing elastic portion
20H1 one opening
22A, 22B opposing positioning portion
3 mounting portion

What is claimed is:

1. A connector mounting member comprising:
a holding portion configured to hold a connector to which a long wire portion is attached; and
a mounting portion configured to mount the connector mounting member to a predetermined counterpart component, wherein
the holding portion includes
an annular frame,
opposing elastic portions formed in the frame so as to oppose each other in an up-down direction, the opposing elastic portions configured to be elastically deformed so as to widen an opposing distance therebetween in the up-down direction and thus press-hold the connector between the opposing elastic portions that oppose each other, and
opposing positioning portions formed on at least one opening side of the frame so as to oppose each other, the opposing positioning portions configured to press-hold the wire portion extending from the connector that is press-held between the opposing elastic portions, between the opposing positioning portions that oppose each other, and configured to less easily widen an opposing distance therebetween by elastic deformation than the opposing elastic portions.

2. The connector mounting member according to claim 1, wherein the frame has a wire side section in which an internal space is spread on an outer circumferential side as compared with a connector holding section in which the opposing elastic portions are formed, in an inner portion on the opposing positioning portion side in a penetration direction of the frame.

3. The connector mounting member according to claim 1, wherein the opposing elastic portions and the opposing positioning portions satisfy a positional relationship in which both the opposing positioning portions seem to pass between the opposing elastic portions that oppose each other without overlapping the opposing elastic portions, as viewed in the penetration direction of the frame.

* * * * *